United States Patent
Matsumoto et al.

(10) Patent No.: US 6,929,361 B2
(45) Date of Patent: Aug. 16, 2005

(54) ANTHRAPYRIDONE COMPOUNDS, WATER-BASE MAGENTA INK COMPOSITIONS AND METHOD OF INK-JET RECORDING

(75) Inventors: Hiroyuki Matsumoto, Saitama (JP); Katsunori Fujii, Saitama (JP); Takafumi Fujii, Saitama (JP); Yasuo Shirasaki, Saitama (JP)

(73) Assignee: Nippon Kayaku Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/490,400
(22) PCT Filed: Sep. 25, 2002
(86) PCT No.: PCT/JP02/09874
§ 371 (c)(1), (2), (4) Date: Mar. 23, 2004
(87) PCT Pub. No.: WO03/027185
PCT Pub. Date: Apr. 3, 2003

(65) Prior Publication Data
US 2004/0239739 A1 Dec. 2, 2004

(30) Foreign Application Priority Data
Sep. 26, 2001 (JP) ........................................ 2001-292853

(51) Int. Cl.$^7$ ................................................. B41J 2/01
(52) U.S. Cl. ........................ 347/100; 347/95; 106/31.47
(58) Field of Search ............................ 347/100, 95, 96, 347/98, 101; 106/31.47, 31.48, 31.77, 31.27, 31.13; 523/160

(56) References Cited

U.S. PATENT DOCUMENTS

| | | | |
|---|---|---|---|
| 2,759,939 A | 8/1956 | Bucheler et al. | ............ 260/272 |
| 6,852,154 B2 * | 2/2005 | Kitamura et al. | ......... 106/31.47 |
| 2004/0174420 A1 * | 9/2004 | Kitamura et al. | ............ 347/100 |

FOREIGN PATENT DOCUMENTS

| | | | | |
|---|---|---|---|---|
| EP | 1 067 155 | 1/2001 | | |
| JP | 56-74173 | 4/1984 | | |
| JP | 2-16171 | 1/1990 | | |
| JP | 2000-109464 | 4/2000 | | |
| JP | 2000-169776 | 6/2000 | | |
| JP | 2000-256587 | * 9/2000 | ........... | C09D/11/00 |
| WO | 99/48981 | 9/1999 | | |

* cited by examiner

Primary Examiner—Manish S. Shah
(74) Attorney, Agent, or Firm—Nields & Lemack

(57) ABSTRACT

New anthrapyridone compounds represented by the general formula (14):

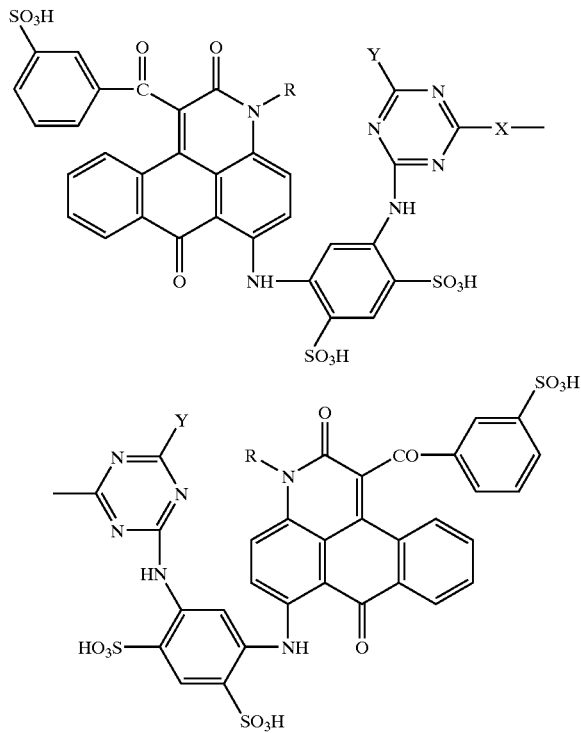

{wherein R represents a hydrogen atom, an alkyl group (optionally substituted with mono- or di-alkylamino group), a lower alkyl group (optionally substituted with a hydroxyl group or a cyano group), or a cyclohexyl group; Y represents a chlorine atom, a hydroxyl group, an amino group, mono- or di-alkylamino group (optionally substituted with a sulfonic acid group, a carboxy group, or a hydroxyl group), an aralkyl- or cycloalkyl-amino group, an alkoxy group, a phenoxy group (optionally substituted with a sulfonic acid group, a carboxy group, an acetylamino group, an amino group, or a hydroxyl group), an anilino group (optionally substituted with a sulfonic acid group or a carboxy group), or a naphthylamino group (optionally substituted with a sulfonic acid group); and X represents a bridging group}; or salts thereof and magenta inks containing the same, which have hues and vividness suitable for ink-jet recording and give records excellent in fastness to light, gas, water and so on.

25 Claims, No Drawings

ANTHRAPYRIDONE COMPOUNDS, WATER-BASE MAGENTA INK COMPOSITIONS AND METHOD OF INK-JET RECORDING

TECHNICAL FIELD

The present invention relates to a new anthrapyridone compound, a water-based magenta ink composition and a method of ink-jet recording.

BACKGROUND ART

Diverse ink jetting processes have been developed for the recording method by means of ink-jet printer, and any process comprises generating ink droplets to deposit onto various recording materials (such as paper, film, cloth) for recording. The recording method by means of ink-jet printer has rapidly been spread in recent years and will be propagated in future because the method brings about no mechanical noise due to the system in which a recording head does not contact with the recording material and because the method advantageously allows the printer to become downsized, to work in a high-speed and to give color printing, easily. For recording an image information or a character information pictured on a computer color display in color by means of an ink-jet printer, the information is generally printed according to subtractive color mixing of inks of four colors, namely yellow(Y), magenta(M), cyan(C) and black(K). In order to print reproducibly an image pictured by additive color mixing of R(red), G(green), B(blue) on a CRT display as faithfully as possible according to subtractive color mixing, the dyestuffs to use, especially ones for a Y,M or C ink, are desired to have color hues close to the respective standards of Y,M and C and vividness. Additionally, it is required that the resulting ink composition is stable for long-term storage and that the resulting printed image is of a high optical density and has excellent fastness including water fastness, light fastness, gas fastness and so on.

Ink-jet printers are increasingly used in a wide range from a small one for OA use to a big one for industrial use. So, excellence in fastness such as water fastness and light fastness of the printed image is more strictly demanded. The water fastness is substantially improved by coating inorganic micro particles such as porous silica, cationic polymer, alumina sol or special ceramics which can absorb dyestuff from ink, on a paper sheet together with PVA resin. Further improvement in quality such as moisture fastness is desired in order to store the printed matter such as photos in good condition. However, light fastness is not yet improved by any established technique. Among tetrachromatic colors of Y,M,C and K, magenta especially has many dyestuffs which are naturally weak in light fastness, and the improvement is an important problem to be solved.

The typical types in chemical structure of magenta. dyestuffs used in a water-soluble ink for ink-jet recording are a xanthene type disclosed by JP Laid-Open No.89811/1979, JP Laid-Open No.60053/1996 and JP Laid-Open No.143798/1996, and an azo type using the H acid disclosed by JP Laid-Open No.62562/1986, JP Laid-Open No.156168/1987, JP Laid-Open No.203970/1991, JP Laid-Open No.157698/1995 and JP Publication No.78190/1995. The xanthene type is indeed excellent in hue and vividness, but is very inferior in light fastness. The azo type using the H acid is good in hue and water fastness, but is inferior in light fastness and vividness. As disclosed by JP Laid-Open No.203970/1991, for example, some magenta dyestuffs in this type being excellent in vividness and light fastness have been developed, but are still inferior in light fastness to dyestuffs of the other hue such as yellow dyestuffs and cyan dyestuffs represented by copper phthalocyanine type.

Recently, the digital camera having been in widespread use, the chance to print out photos at home is increasing. However, there is a problem of color change in photos during storage by the oxidizing gas in the air.

Alternatively, for a chemical structure of magenta dyes being excellent in vividness and light fastness, an anthrapyridone type is known as disclosed by JP Laid-Open No.74173/1984, JP Laid-Open No.16171/1990, JP Laid-Open No.109464/2000, JP Laid-Open No.169776/2000, but can not yet show any satisfactory properties in hue, vividness, light fastness, water fastness, gas fastness and disolving stability. An object of the present invention is to provide a magenta dye which has hue and vividness suitable for ink-jet recording and gives the recorded material with a high fastness in light fastness, gas fastness and moisture fastness; and a magenta dyestuff suitable therefor.

DISCLOSURE OF THE INVENTION

The present inventors made a diligent study to solve the above problem and, as a result, have completed the present invention. Namely, the present invention is as follows:

(1) A new anthrapyridone compound represented by the following formula (14):

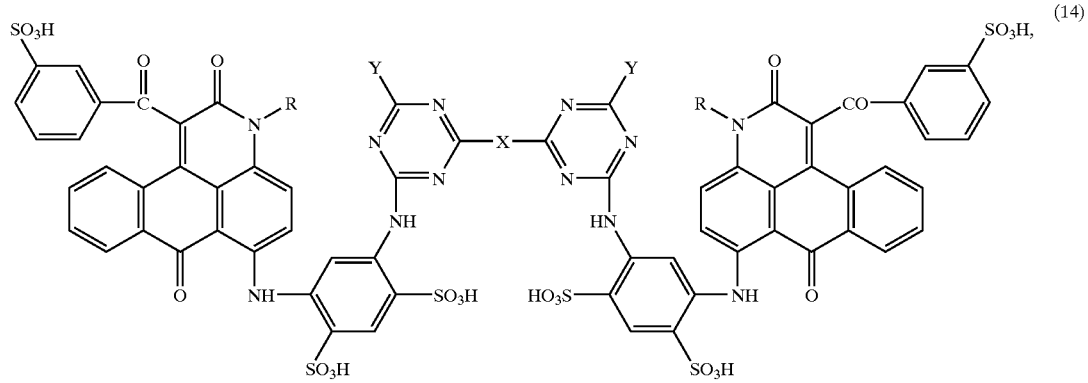

wherein R represents a hydrogen atom, an alkyl group, a hydroxy lower alkyl group, a cyclohexyl group, mono- or dialkylaminoalkyl group or a cyano lower alkyl group;

Y represents a chlorine, a hydroxyl group, an amino group, mono- or dialkylamino group (optionally substituted with a substituent selected from the group consisting of a sulfonic acid group, a carboxy group and a hydroxyl group on an alkyl group), an aralkylamino group, a cycloalkylamino group, an alkoxy group, a phenoxy group (optionally substituted with the substituent selected from the group consisting of a sulfonic acid group, a carboxy group, an acetylamino group, an amino group and a hydroxyl group on a benzene ring), an anilino group (optionally substituted with one or two substituents selected from the group consisting of a sulfonic acid group and a carboxy group), a naphthylamino group (wherein a naphthyl group is optionally substituted with a sulfonic acid group), or mono- or dialkylaminoalkylamino group;

X repsresents a bridging group;
or the salt thereof;

(2) A new anthrapyridone compound represented by the following formula (1):

wherein Y represents a chlorine, a hydroxyl group, an amino group, an alkylamino group, a dialkylamino group, an aralkylamino group, a cycloalkylamino group, an alkoxy group, a phenoxy group (optionally substituted with the substituent selected from the group consisting of a sulfonic acid group, a carboxy group, an acetylamino group, an amino group and a hydroxyl group), a sulfonic acid group, mono- or dialkylamino group having a carboxy group or a hydroxyl group, an anilino group (optionally substituted with one or two substituents selected from the group consisting of a sulfonic acid group and a carboxy group), a naphthylamino group (wherein a naphthyl group is optionally substituted with a sulfonic acid group), or mono- or dialkylaminoalkylamino group;

X repsresents a bridging group;

or the salt thereof, (4) A new anthrapyridone compound according to the above (3) which is represented by the following formula (2):

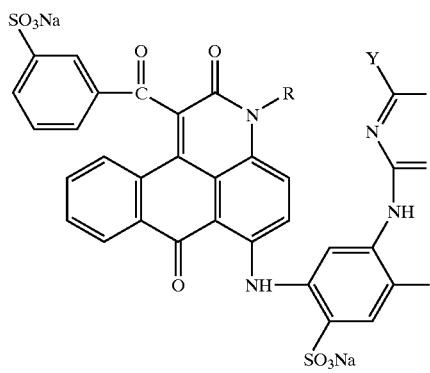
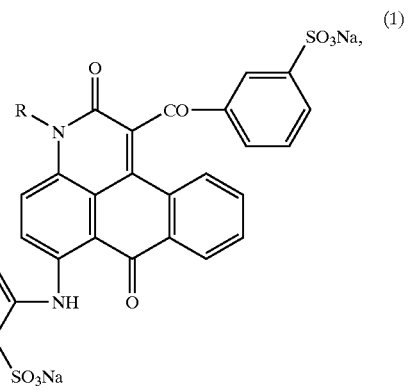

(1)

wherein R and Y represent the same as mentioned for the above formula (14);
or the salt thereof,
(3) A new anthrapyridone compound represented by the following formula (15):

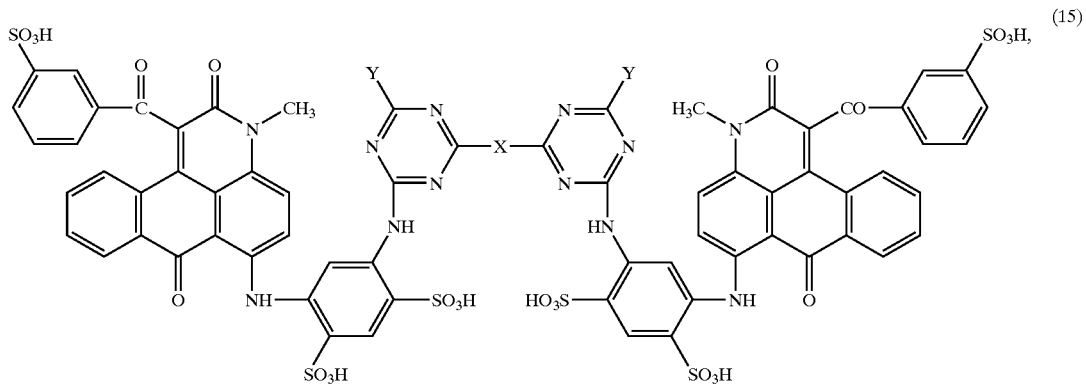

(15)

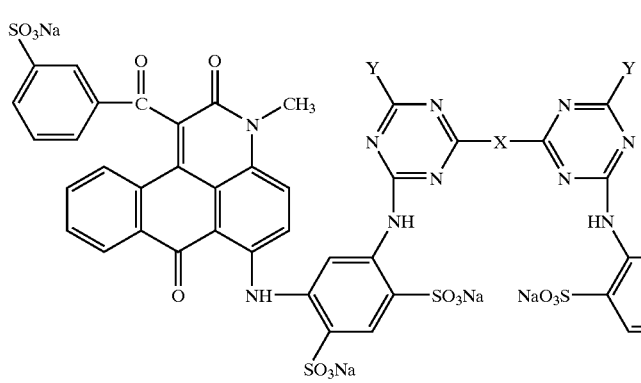
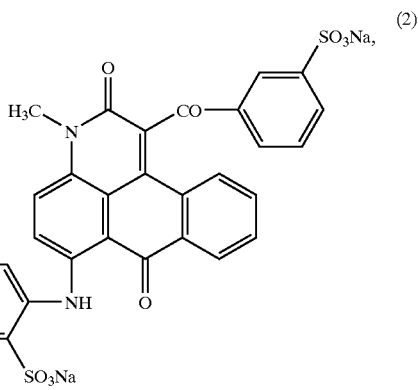

wherein Y represents the same as mentioned for the above formula (15);

or the salt thereof, (5) A new anthrapyridone compound or the salt thereof according to any one of the above (1) to (4), wherein Y is a hydroxyl group or an amino group, (6) A new anthrapyridone compound or the salt thereof according to any one of the above (1) to (4) wherein Y is an amino group, (7) A new anthrapyridone compound or the salt thereof according to any one of the above (1) to (4), wherein Y is an amino group and a bridging group X is a diaminoalkylene group, (8) A new anthrapyridone compound or the salt thereof according to any one of the above (1) to (4), wherein Y is an amino group and a bridging group X is an optionally substituted diaminophenylene group, (9) A new anthrapyridone compound or the salt thereof according to any one of the above (1) to (4), wherein Y is a chlorine or an amino group and a bridging group X is a diamino-dicyclohexylmethane group optionally having a substituent on a cyclohexyl ring,

(10) A new anthrapyridone compound represented by the following formula (3):

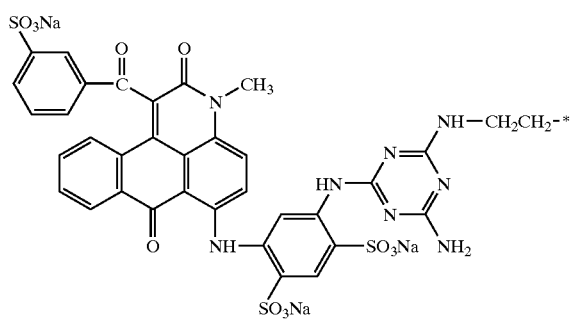

-continued

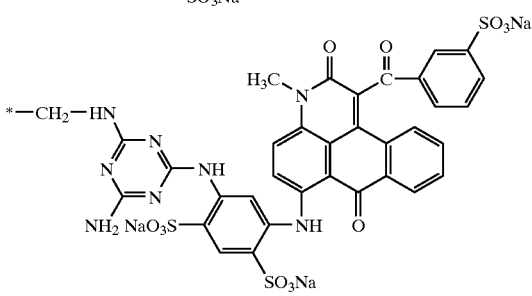

or the salt thereof,

(11) A new anthrapyridone compound represented by the following formula (4):

or the salt thereof,

(12) A new anthrapyridone compound represented by the following formula (5):

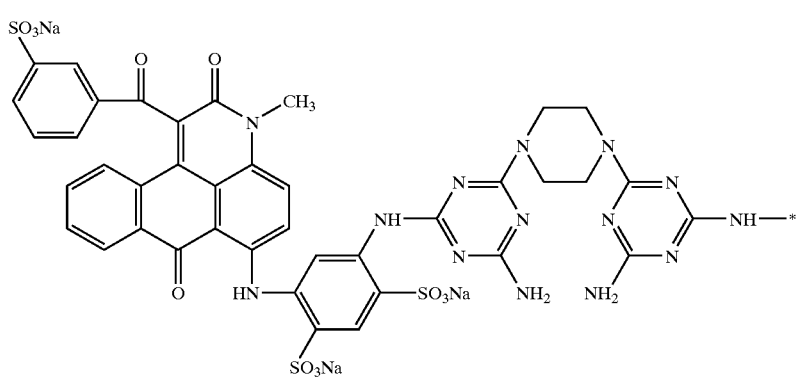
(5)
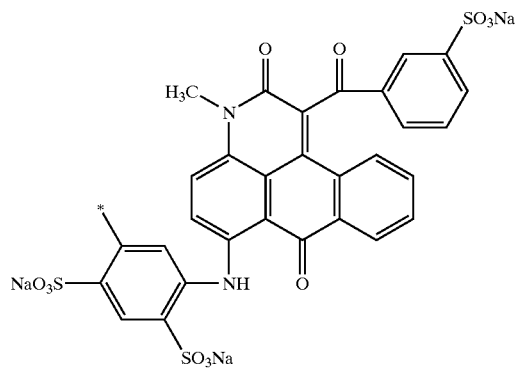
or the salt thereof,
(13) A new anthrapyridone compound represented by the following formula (16):
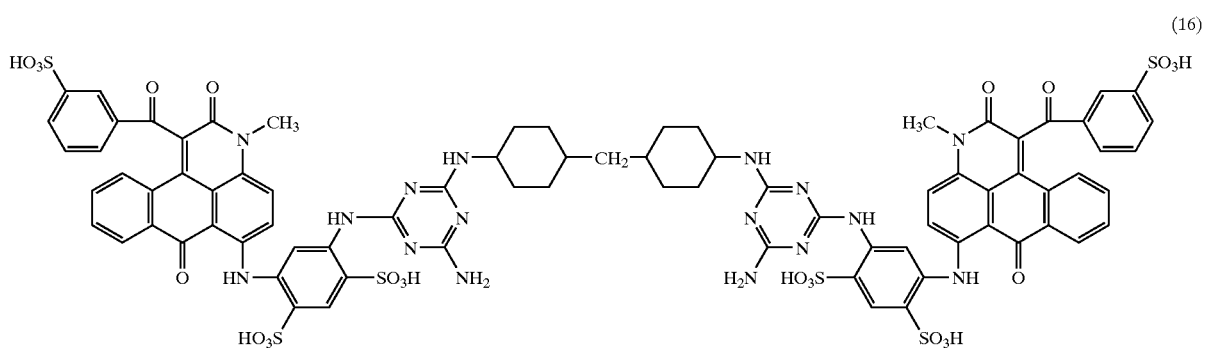
(16)
or the salt thereof,
(14) A new anthrapyridone compound represented by the following formula (17):

(17)

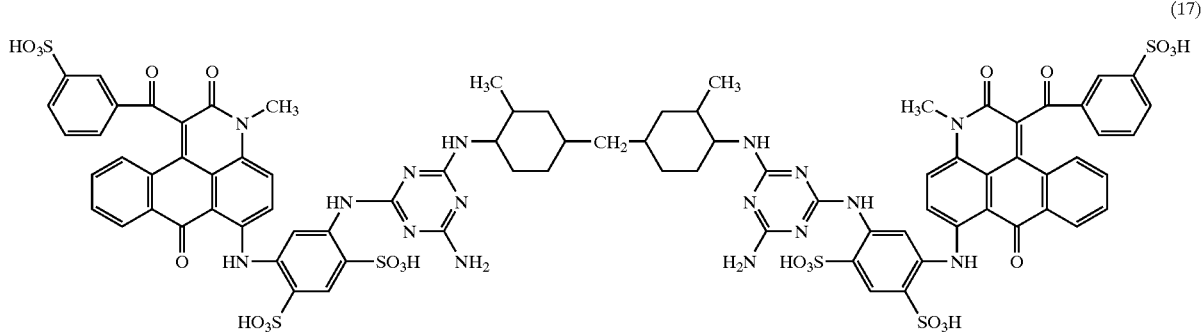

or the salt thereof,
(15) A water-based magenta ink composition characterized by comprising a new anthrapyridone compound or the salt thereof according to any one of the above (1) to (14) as a dyestuff,
(16) A water-based magenta ink composition comprising a water soluble organic solvent according to the above (15),
(17) A water-based magenta ink composition according to any one of the above (15) to (16) comprising an inorganic salt having a content of 1% by mass or less,
(18) A water-based magenta ink composition according to any one of the above (15) to (17) which is prepared for ink-jet recording,
(19) A method for ink-jet recording characterized by using the water-based magenta ink composition according to any one of the above (15) to (18) as an ink, wherein ink droplets are ejected responding to the record signals to record onto a recording material,
(20) A method for ink-jet recording according to the above (19), wherein the recording material is an information transmission sheet,
(21) A container comprising the water-based magenta ink composition according to any one of the above (15) to (18),
(22) An ink-jet printer comprising the container according to the above (21),
(23) A colored article comprising a new anthrapyridone compound or the salt thereof according to the above (1) to (14),
(24) An anthrapyridone compound represented by the formula (6):

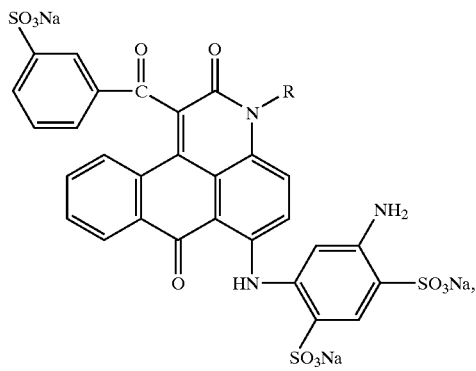

(6)

wherein R represents the same as mentioned for the formula (1),

(25) A water-based magenta ink composition according to the above (15), wherein said composition comprises an inorganic salt having a dyestuff content of 1% by mass or less and further comprises a water soluble organic solvent,
(26) An anthrapyridone compound or the salt thereof according to any one of the above (1) to (4), wherein a bridging group X is represented by the formulae:

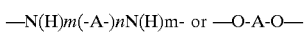

—N(H)$m$(-A-)$n$N(H)m- or —O-A-O— wherein A is a divalent hydrocarbon residue having 1 to 20 carbon atoms, optionally comprising a nitrogen atom, an oxygen atom or a sulfur atom;
n indicates an integer of 1 or 2;
m indicates an integer of 1 or 0, when n is 1, m indicates 1; when n is 2, m indicates 0.

BEST MODE FOR CARRYING OUT THE INVENTION

The new anthrapyridone compound of the present invention is represented by the above formula (14). The typical example thereof is the compound represented by the above formula (1).

As used herein, "alkyl" is intended to include those of generally defined as "alkyl" without any limitation. It preferably includes, unless particularly specified, an alkyl group having about 1 to 10 carbon atoms, more preferably includes a lower alkyl group having about 1 to 4 carbon atoms. An "alkyl" in such as an alkoxy group and an aralkyl group also means the same as above.

Examples of an alkyl group for R in the formula (14), (1) or the like, include a ($C_1$–$C_4$)alkyl group such as methyl, ethyl, n-propyl and n-butyl. Examples of an alkyl group for a hydroxyl lower alkyl group and a cyano lower alkyl group in R include such as an ethyl group and a propyl group, preferably include an ethyl group. Examples of an alkylamino group for Y include a ($C_1$–$C_8$) alkylamino group such as a methylamino group, an ethylamino group, a butylamino group and 2-ethylhexylamino group. Examples of a dialkylamino group include a ($C_1$–$C_8$)dialkylamino group such as a diethylamino group, a dibutylamino group and a dihexylamino group. Examples of an aralkylamino group include a phenyl($C_1$–$C_6$)alkylamino group such as a benzylamino group, a phenethylamino group and a phenylpropylamino group. Examples of a cycloalkylamino group include a cyclo($C_5$–$C_7$)alkylamino group such as a cyclohexylamino group and a cyclopentylamino group. Examples of an alkoxy group include a ($C_1$–$C_4$)alkoxy group such as a methoxy group, an ethoxy group, a n-propoxy group, an isopropoxy group and a butoxy group. Examples of an alkyl group in an alkylamino group having a sulfonic acid group or a carboxy group include a ($C_1$–$C_4$)alkyl group such as a methyl group, an ethyl gorup, a n-propyl group and a n-butyl group.

In Y, examples of a phenoxy group which are optionally substituted with a substituent selected from the group consisting of a sulfonic acid group, a carboxy group, an acetylamino group, an amino group and a hydroxyl group include such as a 4-sulfophenoxy group, a 4-carbixyphenoxy group, 4-acetylamino-phenoxy group, a 4-aminophenoxy group and 4-hydroxyphenoxy group.

In Y, examples of an alkylamino group having a sulfonic acid group or a carboxy group include a 2-sulfoethylamino group, a carboxymethylamino group, a 2-carboxyethylamino group, a 1-carboxyethylamino group, a 1,2-dicarboxyethylamino group or a di(carboxymethy) amino group. Examples of an alkylamino group having a hydroxyl group include such as a hydroxyethylamino group and dihydroxyethylamino group.

In Y, examples of an anilino group optionally substituted with one or two substituents selected from the group consisting of a sulfonic acid group and a carboxy group include such as a 2,5-disulfoanilino group, a 3-sulfoanilino group, a 2-sulfoanilino group, a 4-sulfoanilino group, a 2-carboxy-4-sulfoanilino group and a 2-carboxy-5-sulfoanilino group.

In Y, examples of naphthylamino group optionally substituted with a sulfonic acid group include such as a 3,6,8-trisulfo-1-naphthylamino group, a 4,6,8-trisulfo-2-naphthylamino group, a 3,6,8-trisulfo-2-naphthylamino group and a 4,8-disulfo-2-naphthylamino group.

A bridging group for X is a divalent group having either a nitrogen atom or an oxygen atom as binding sites at both ends of a $C_1$–$C_{20}$ hydrocarbon residue which optionally comprises a nitrogen atom, an oxygen atom or a sulphur atom. Examples thereof include a group represented by

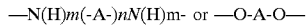
—N(H)m(-A-)nN(H)m- or —O-A-O— wherein A is a divalent hydrocarbon residue having 1 to 20 carbon atoms, optionally comprising a nitrogen atom, an oxygen atom or a sulfur atom; n indicates an integer of 1 or 2; m indicates an integer of 0 or 1; when n is 1, m indicates 1; when n is 2, m indicates 0.

Examples of the above divalent hydrocarbon residue having 1 to 20 carbon atoms include a divalent aliphatic group having 1 to 15 carbon atoms optionally comprising 1 to 2 hetero atoms such as a nitrogen atom, an oxygen atom or sulphur atom; a divalent aromatic group having 3 to 10 carbon atoms, preferably having 5 to 10 carbon atoms optionally comprising 1 to 3 hetero atoms such as a nitrogen atom, an oxygen atom or sulphur atom and a divalent group formed by combining the above described aliphatic group and aromatic group. Those groups may optionally include substituents such as a sufonic acid group, a carboxyl group, an amino group and a lower alkyl group when said residue is an aromatic group.

Examples of the above aliphatic groups include $C_1$–$C_6$ (poly)methylene optionally substituted with lower alkyl groups such as methylene, di-methylene (ethylene), tri-methylene (propylene), 2-methyltrimethylene (2-methylpropylene), tetra-methylene (butylene) and hexamethylene; $C_5$–$C_7$ cycloalkylene such as cyclopentane-1,2- or 1,3-diyl, cyclohexane-1,2-, -1,3- or -1,4-diyl and cycloheptane-diyl; an aliphatic group consisting of lower alkylene group and $C_5$–$C_7$ aliphatic ring (optionally substituted with lower alkyl groups) such as metylenecyclohexane-1,4-diylmethylene (—$CH_2$—$C_6H_{10}$—$CH_2$—), methylenedicyclohexane-diyl(—$C_6H_{10}$—$CH_2$—$C_6H_{10}$—), methylenebis(methylcyclohexane-diyl) {—$C_6H_{10}(CH_3)$—$CH_2$—$C_6H_{10}(CH_3)$—} and cyclohexane-diyl-dimethylene(—$CH_2$—$C_6H_{10}$—$CH_2$—); and $C_1$–$C_7$ aliphatic groups comprising hetero atoms such as methyleneoxymethylene(—$CH_2$—O—$CH_2$—), bis(dimethylene)amino(—$C_2H_4$—NH—$C_2H_4$—), metylenethiometylene(—$CH_2$—S—$CH_2$—) and oxydicyclohexane-diyl-(—$C_6H_{10}$—O—$C_6H_{10}$—).

Examples of the divalent aromatic groups may include an aromatic group having 6 to 10 carbon atoms such as phenylene(—$C_6H_4$—), naphtylene(—$C_{10}H_6$—).

The divalent groups formed by combining the above described aliphatic group and aromatic group may include such as xylylene(—$CH_2$—$C_6H_4$—$CH_2$—).

More preferable examples for the above A include dimethylene, hexamethylene, 1,3-xylylene, methylenedicyclohexane-4,1-diyl, methylenebis(2-methylcyclohexane-4,1-diyl) and cyclohexane-1,3-diyl-dimethylene.

Examples of a bridging group X include a diaminoalkylene group such as 1,2-diaminoethylene group (—NH—$CH_2CH_2$—NH—), 1,4-diaminobutylene group (—NH—$C_4H_8$—NH—) and 1,6-diaminohexylene group (—NH—$C_6H_{12}$—NH—); a diaminophenylene group such as 1,4-piperazinediyl group (—$NC_4H_8N$—), 1,4-diaminophenylene group (—NH—$C_6H_4$-p-NH—) and 1,3-diaminophenylene group (—NH—$C_6H_4$-m-NH—); a substituted diaminophenylene group such as 4-sulfo-1,3-diaminophenylene group {—NH—$C_6H_4$(p-$SO_3H$)-m-NH—} and 5-carboxy-1,3-diaminophenylene group; 1,3-diaminoxylylene group (—NH—$CH_2$—$C_6H_4$-m-$CH_2$—NH—); 1,4-diaminoxylylene group (—NH—$CH_2$—$C_6H_4$-p-$CH_2$—NH—); 4,4'-diamino-2-sulfo-diphenylamino group {—NH—$C_6H_4$(m-$SO_3H$)—NH—$C_6H_4$-p-NH—}; 4,4'-diaminodicyclohexylmethane group (—NH—$C_6H_{10}$-4'-$CH_2$—$C_6H_{10}$-4'-NH—); 4,4'-diamino-3,3'-dimethyldicyclohexylmethane group {—NH—$C_6H_{10}$(3-$CH_3$)-4-$CH_2$—$C_6H_{10}$(3'-$CH_3$)-4'-NH—}; 1,3-bis(aminomethyl)cyclohexane group (—NH—$CH_2$—$C_6H_{10}$-3-$CH_2$—NH—); a dioxy substituted alkylene group such as dioxyethylene group (—O—$CH_2CH_2$—O—), 1,4-dioxybutylene group (—O—$C_4H_8$—O—), 2,2'-dioxyethylether group (—O—$CH_2CH_2$—O—$CH_2CH_2$—O—); 1,4-dioxyphenylene group (—O—$C_6H_4$-p-O—); 1,3-dioxyphenylene group (—O—$C_6H_4$-m-O—); 4,4'-dioxyphenylether group (—O—$C_6H_4$-p-O—$C_6H_4$-p-O—); 4,4'-dioxyphenylenethioether group (—O—$C_6H_4$-p-S—$C_6H_4$-p-O—); 2,5- and 2,6-norbornanediamino group; 1,4-dioxymethylcyclohexylene group (—O—$CH_2$—$C_6H_{10}$-4-$CH_2$—O—) or the like. Further, examples of a group represented by the formula —N(H)m(-A-)nN(H)m-, wherein n is 2 and m is 0, includes such as the above 1,4-piperazinediyl(—NC$_4$H$_8$N—).

Examples of preferable combination of R,Y and X are such that R is a hydrogen atom or a methyl group; Y is a chlorine atom, a hydroxyl group or an amino group; X is a diaminoethylene group, 1,4-piperazinediyl group, 1,3-diaminoxylylene group, 4,4'-diaminodicyclohexylmethane group, 4,4'-diamino-3,3'-dimethyldicyclohexylmethane group, 1,3-bis(aminomethyl)cyclohexane group or the like.

Examples of a new anthrapyridone compound of the present invention represented by the above formula (1) are shown in Table 1. In Table 1, diaminoethylene means 1,2-diaminoethylene group (—NH—CH$_2$CH$_2$—NH—). Ph represents a phenyl group. In the same manner, for example, PhO represents a phenoxy group, NHPh represents an anilino group and so on. And NHPh(p-SO3H) represents 4-sulfoanilino group (p-SO3H means that a sulfonic acid is present at para position on a phenyl group), NHPh(COOH)2(3,5) represents 3,5-dicarboxyanilino group {Ph(COOH)2 (3,5)means that a phenyl group is substituted with a carboxyl group at 3 and 5 position} and so as represented other groups. naphthyl represents a naphthl group, NH-2naphthyl (SO3H)3(3,6,8) represnts 3,6,8-trisulfo-2naphtylamino, NH(cyclohexyl) means cyclohexylamino.

TABLE 1

| No. | R | X | Y |
|---|---|---|---|
| 1 | CH3 | diaminoethylene | OH |
| 2 | CH3 | diaminoethylene | Cl |
| 3 | CH3 | diaminoethylene | NH2 |
| 4 | CH3 | 1,4-piperazinediyl | Cl |
| 5 | CH3 | 1,4-piperazinediyl | NH2 |
| 6 | CH3 | 1,3-diaminoxylylene | Cl |
| 7 | CH3 | 1,3-diaminoxylene | NH2 |
| 8 | CH3 | 1,4-diaminoxylene | NH2 |
| 9 | CH3 | bis(3-aminopropyl)ether | NH2 |
| 10 | CH3 | 3,3'-iminodi(propylamine) | NH2 |
| 11 | CH3 | 2,2'-iminodi(ethylamine) | NH2 |
| 12 | CH3 | 1,4-diaminobutylene | NH2 |
| 13 | CH3 | 1,6-diaminohexylene | NH2 |
| 14 | CH3 | 1,4-diaminophenylene | NH2 |
| 15 | CH3 | 1,3-diaminophenylene | NH2 |
| 16 | CH3 | 1,3-diamino-4-sulfophenylene | NH2 |
| 17 | CH3 | 1,3-diamino-5-carboxyphenylene | NH2 |
| 18 | CH3 | 4,4'-diamino-2-sulfodiphenylamine | NH2 |
| 19 | CH3 | 4,4'-diamino-3,3'-dimethyl-dicyclohexylmethane | NH2 |
| 20 | CH3 | 4,4'-diamino-dicyclohexylmethane | NH2 |
| 21 | CH3 | diaminoethylene | NH(CH2COOH) |
| 22 | CH3 | diaminoethylene | NH(CH2CH2COOH) |
| 23 | CH3 | diaminoethylene | NH(CH2(COOH)CH2COOH) |
| 24 | CH3 | diaminoethylene | NH(CH2(COOH)CH2CH2COOH) |
| 25 | CH3 | diaminoethylene | CH3O |
| 26 | CH3 | diaminoethylene | C6H5O |
| 27 | CH3 | diaminoethylene | NH(CH2CH2SO3H) |
| 28 | CH3 | diaminoethylene | NHC6H5 |
| 29 | CH3 | diaminoethylene | NHPh(p-SO3H) |
| 30 | CH3 | diaminoethylene | NHPh(COOH)2(3,5) |
| 31 | CH3 | diaminoethylene | NHPh(COOH)2(2,5) |
| 32 | CH3 | diaminoethylene | NHPh(o-SO3H) |
| 33 | CH3 | diaminoethylene | NHPh(m-SO3H) |
| 34 | CH3 | diaminoethylene | NHPh(SO3H)2(2,5) |
| 35 | CH3 | diaminoethylene | NH(CH2CH2CH2N(C2H5)2) |
| 36 | CH3 | diaminoethylene | NH(CH2CH2CH2N(CH3)2) |
| 37 | CH3 | diaminoethylene | NH-2naphthyl(SO3H)3(3,6,8) |
| 38 | CH3 | diaminoethylene | NH-2naphthyl(SO3H)3(4,6,8) |
| 39 | CH3 | diaminoethylene | NH-2naphthyl(SO3H)2(4,8) |
| 40 | CH3 | diaminoethylene | NH(n-C4H9) |
| 41 | CH3 | diaminoethylene | NH(cyclohexyl) |
| 42 | CH3 | diaminoethylene | NH(CH2CH2OH) |
| 43 | CH3 | diaminoethylene | N(CH2CH2OH)2 |
| 44 | CH3 | diaminoethylene | NHCH2Ph |
| 45 | H | diaminoethylene | NH2 |
| 46 | H | 1,3-diaminoxylene | NH2 |
| 47 | H | 1,4-piperazinediyl | NH2 |
| 48 | C2H5 | 1,3-diaminoxylylene | NH2 |
| 49 | C4H9 | 1,3-diaminoxylylene | NH2 |
| 50 | isoC3H7 | 1,3-diaminoxylylene | NH2 |
| 51 | cyclohexyl | 1,3-diaminoxylylene | NH2 |
| 52 | C3H6N(C2H5)2 | 1,3-diaminoxylylene | NH2 |
| 53 | CH3 | 1,4-dioxyphenylene | NH2 |
| 54 | CH3 | 4,4'-dioxydiphenylether | NH2 |
| 55 | CH3 | 4,4'-dioxydiphenylthioether | NH2 |
| 56 | CH3 | 4,4'-dioxydiphenylsulfone | NH2 |
| 57 | CH3 | 4,4'-dioxydiphenylmethane | NH2 |
| 58 | CH3 | 2,5-and 2,6-norbornanediamino | NH2 |

TABLE 1-continued

| No. | R | X | Y |
|---|---|---|---|
| 59 | CH3 | 1,4-dioxymethylcyclohexylene | NH2 |
| 60 | CH3 | 2,5-dimethyl-1,4-piperazinediyl | NH2 |

In order to obtain the compound represented by the formula (1) having amino groups at both ends of the bridging group X, 2 mol of the compound represented by the formula (6) is reacted with 2–2.4 mol of 2,4,6-trichlorostriazine (cyanuric chloride) in water at pH 3–7 at 5–35° C., for 2–8 hours to give the first condensate represented by the formula (7): - -

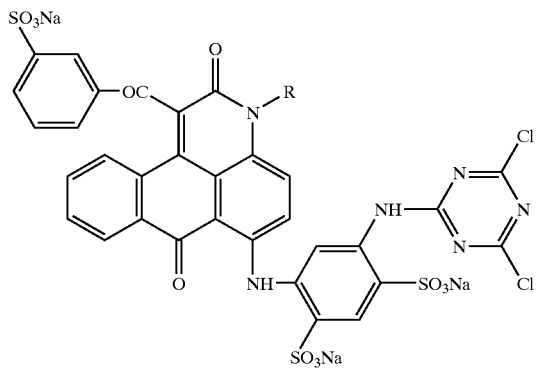

(7)

which is then reacted with 1 mol of the diamino compound of the following formula (8):

$HN(H)m(-A-)nN(H)mH$ (8)

le;2qwherein A is a bridging group such as a divalent $C_1$–$C_{20}$ hydrocarbon residue optionally comprising a nitrogen atom, an oxygen atom or a sulphur atom; n indicates 1 or 2, m indicates 1 or 0; when n is 1, m indicates 1; when n is 2, m indicates 0. The preferable examples of A include $C_1$–$C_6$(poly)methylene, optionally substituted phenylene, xylylene, methylenedicyclohexane-diyl, methylenebis(methylcyclohexane-diyl) and cyclohexane-diyl-dimethylene, more preferably include dimethylene, hexamethylene, 1,3-xylylene, methylenedicyclohexane-4,1-diyl, methylenebis(2-methlcyclohexane)-4,1-diyl, cyclohexane-1,3-diyl-dimethylene; at pH 4–10, at 5–90° C., for 10 minutes —5 hours to give the second condensate represented by the formula (9), Y being a chlorine atom and both sides of the bridging group X being amino groups.

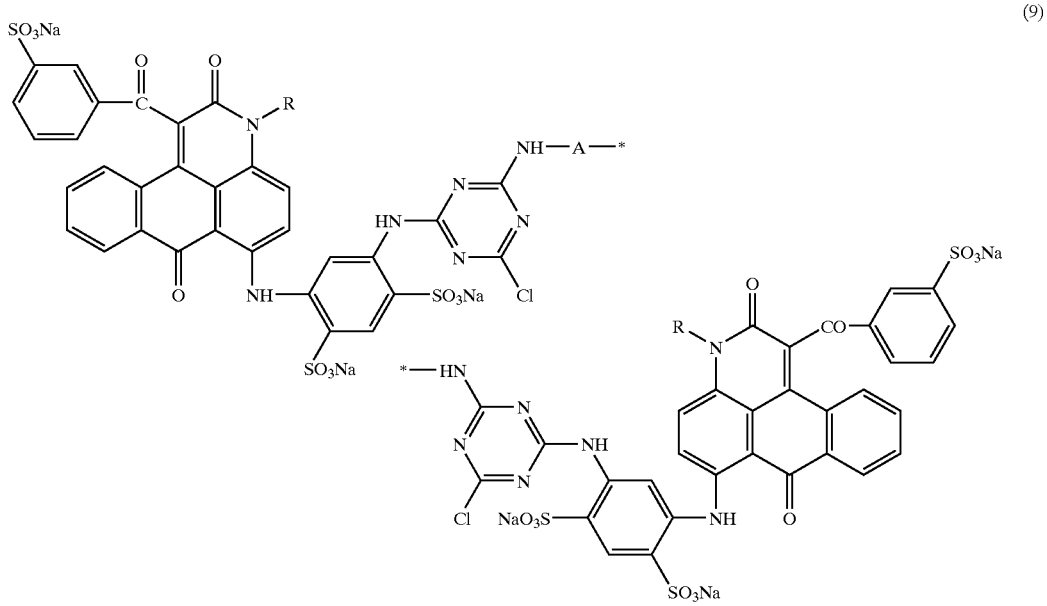

(9)

Further, a compound that —NH-A-NH— of the formula (9) is replaced by —N(-A-)$_2$N— is obtained when the compound represented by the formula HN(-A-)$_2$NH (in the formula (8), n=2, m=0) such as piperidine is used. Consecutively, the second condensate is either hydrolyzed at pH 9–12 at 70–90° C., for 1–5 hours, or reacted with ammonia, corresponding amines, phenols, naphthols or alcohols such as methanol at pH 8–10, at 90–100° C., for 3–8 hours to give the third condensate represented by the formula (10), Y being other than a chlorine atom.

formula (8) is used. Order of the condensation may be determined depending on the reactivities of the related compounds, but is not limited to the above.

The preferable examples of the anthrapyridone compound of the present invention represented by the above formula (10), including the compounds many of which have already shown in Table 1, are shown in Table 2.

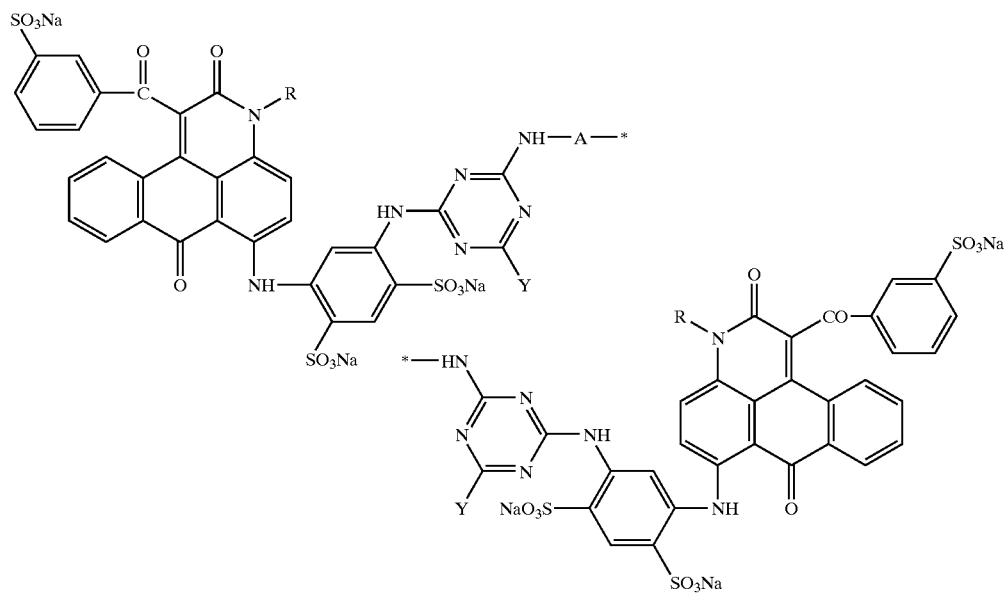

(10)

TABLE 2

| No. | R | X | Y |
|---|---|---|---|
| 1-1 | CH3 | methylenedicyclohexane-4,1-diyl | NH2 |
| 1-2 | CH3 | methylenedicyclohexane-4,1-diyl | ethylamino |
| 1-3 | CH3 | methylenedicyclohexane-4,1-diyl | propylamino |
| 1-4 | CH3 | methylenedicyclohexane-4,1-diyl | propylamino |
| 1-5 | CH3 | methylenedicyclohexane-4,1-diyl | butylamino |
| 1-6 | CH3 | methylenedicyclohexane-4,1-diyl | 2-ethylhexylamino |
| 1-7 | CH3 | methylenedicyclohexane-4,1-diyl | benzyl |
| 1-6 | CH3 | methylenedicyclohexane-4,1-diyl | 2-ethylhexylamino |
| 1-7 | CH3 | methylenebis(2-methylcyclohexane-4,1-diyl) | NH2 |
| 1-8 | CH3 | cyclohexane-1,3-diyl-dimethylene | NH2 |
| 1-9 | CH3 | cyclohexane-1,3-diyl-dimethylene | ethylamino |
| 1-10 | CH3 | cyclohexane-1,3-diyl-dimethylene | butylamino |
| 1-11 | CH3 | cyclohexane-1,3-diyl-dimethylene | dibutylamino |
| 1-12 | CH3 | cyclohexane-1,3-diyl-dimethylene | 2-ethylhexylamino |
| 1-13 | CH3 | cyclohexane-1,3-diyl-dimethylene | benzyl |
| 1-14 | CH3 | methylenedicyclohexane-4,1-diyl | cyclohexylamino |
| 1-15 | CH3 | methylenedicyclohexane-4,1-diyl | cyclopentylamino |
| 1-16 | CH3 | methylenedicyclohexane-4,1-diyl | diethylaminopropylamino |
| 1-17 | CH3 | methylenedicyclohexane-4,1-diyl | dibutylaminopropylamino |

Further, a compound that —NH-A-NH— of the formula (10) is replaced by —N(-A-)$_2$N— is obtained when the compound represented by the formula HN(-A-)$_2$NH in the In stead of the diamino compound of the above formula (8), the glycol coumpound represented by the following formula:

HO-A-OH wherein A means the same as the above;
is subjected to a conventional condensation reaction to give a compound that —NH-A-NH— of the formula (9) is replaced by —O-A-O—. In the same manner, a compound that the bridging group —NH-A-NH— of the formula (10) is replaced by —O-A-O— can be obtained.

The compound thus obtained exists as a free acid or the salt thereof. The free acid or the salt thereof can be used in the present invention. The salt can be used as an alkali metal salt, an alkali earth metal salt, an alkylamine salt, an alkanolamine salt or an ammonium salt. The preferable salt includes an alkali metal salt such as a sodium salt, a potassium salt and a lithium salt; an alkanolamine salt such as a monoethanolamine salt, a diethanolamine salt, a triethanolamine salt, a monoisopropanolamine salt, a diisopropanolamine salt and a triisopropanolamine salt; and an ammonium salt. For preparing, sodium chloride is added, for example, to the reaction solution of the above third condensate and salting out thereby and filtrating to obtain the sodium salt as a wet cake, which is again dissolved in water followed by adding hydrochloric acid to adjust the pH to 1–2. The deposited crystal is filtered to obtain the free acid (which may partly include the sodium salt). While the free acid as a wet cake is stirred in water, potassium hydroxide, lithium hydroxide or aqueous ammonia for example is added to make an alkaline solution to obtain the potassium salt, the lithium salt or the ammonium salt respectively.

The compound of the formula (6) can be obtained by the following process:

1 mol of the anthraquinone compound of the following formula (11):

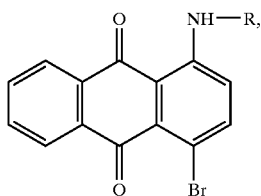

(11)

wherein R means the same as the above; is reacted with 1.1–3 mole of ethyl benzoylacetate in a polar solvent such as xylene, under the presence of a basic compound such as sodium carbonate, at 130–180° C., 5–15 hours to give the compound of the following formula (12):

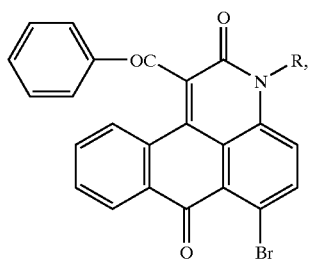

(12)

wherein R means the same as the above;

Then, 1 mol of the compound of the formula (12) is reacted with 1–5 mol of methaminoacetanilide in a non-proton polar organic solvent such as N,N-dimethylformamide under the presence of a base such as sodium carbonate and a copper catalyst such as copper acetate at 110–150° C. for 2–6 hours by way of the Ullmann reaction to give a condensate of the following formula (13):

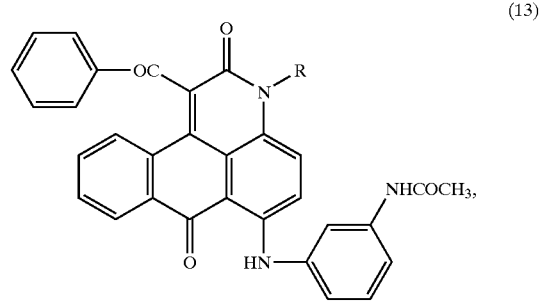

(13)

wherein R means the same as the above;

Consecutively, the compound of the formula (13) is sulfonated and hydrolyzed acetyl amino group to remove the acetyl group with 8–15% fuming sulfuric acid at 50–120° C. to give the anthrapyridone compound of the general formula (6):

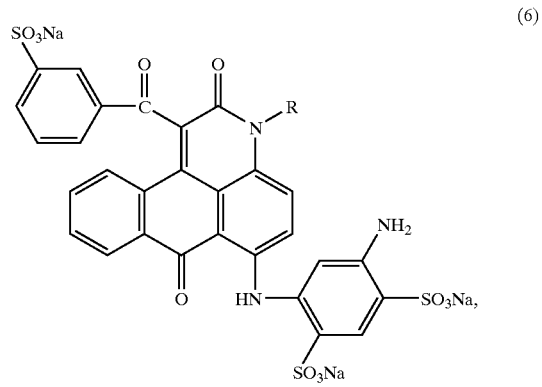

(6)

wherein R means the same as of the formula (1).

The water-based magenta ink composition of the present invention can be obtained by dissolving the compound represented by the formula (1) or (2) or the salt thereof in water or a aqueous solvent {water containing a water-soluble organic solvent (including a solubilizer) which will be described later}. The preferable ink pH is about 6 to 11. For use in an ink-jet recording printer, it is preferable to use a water-based ink composition whose dyestuff component contains an amount as little as possible of an inorganic material such as the chloride and the sulfate of a metal positive ion. For example, the total content of sodium chloride and sodium sulfate in the dyestuff component is 1% by mass or less relative to the total amount of the dyestuff component. In order to produce the dyestuff component of the present invention having a low content of inorganic salt, it is sufficient to repeat a desalting treatment, for example, by a conventional method such as reverse osmotic membrane or by stirring a dry product or a wet cake of the present invention in a mixed solvent of methanol and water, then filtering and drying.

The water-based ink composition of the present invention is prepared by using water as a medium, containing the compound the present invention or the salt thereof preferably by 0.1 to 20% by mass, more preferably by 1 to 10% by mass, more preferably 2 to 8% by mass. The water-based ink composition of the present invention also may contain a water-soluble organic solvent by 0–30% by mass and ink regulators by 0 to 5% by mass. The remainder is water.

The ink composition of the present invention is prepared by adding the compound of the present invention or the salt thereof, if necessary, the above water-soluble organic solvent and the ink regulators into purified water such as distilled water and mixing them together. Alternatively, the compound of the present invention or the salt thereof may be added in a mixture of water, the above water-soluble organic solvent and the ink regulators to dissolve. The resulting ink composition may be filtered, if necessary, to remove the contaminants from the composition.

The usable water-soluble organic solvent includes a $C_1$–$C_4$ alkanol such as methanol, ethanol, propanol, isopropanol, butanol, isobutanol, secondary butanol and tertiary butanol; a carboxylic amide such as N,N-dimethylformamide and N,N-dimethylacetoamide; a lactam such as N-methylpyrrolidin-2-one; a cyclic urea such as 1,3-dimetylimidazolidin-2-one or 1,3-dimethylhexahydropyrimid-2-one; a ketone or a keto-alcohol such as acetone, methyl ethyl ketone, and 2-methyl-2-hydroxypentan-4-one; an ether such as tetrahydrofuran and dioxane; mono-, oligo- or poly-alkylene glycol or thioglycol having $C_2$–$C_6$ alkylene units, such as ethylene glycol, 1,2- or 1,3-propylene glycol, 1,2- or 1,4-butylene glycol, 1,6-hexylene glycol, diethylene glycol, triethylene glycol, dipropylene glycol, thiodiglycol, polyethylene glycol and polypropylene glycol; polyols(triols) such as glycerin and hexane-1,2,6-triol; $C_1$–$C_4$ alkyl ethers of polyhydric alcohols, such as ethylene glycolmonomethyl ether, ethylene glycol-monoethyl ether, diethylene glycol monomethyl ether, diethylene glycol monoethyl ether, triethylene glycol monomethyl ether, and triethylene glycol monoethyl ether; γ-butyrolactone; and dimethylsulfoxide. These organic solvents may be used in a combination of two or more.

The preferable examples of water-miscible organic solvents include N-methylpyrrolidin-2-one and mono-, di- or tri-alkylene glycol having $C_2$–$C_6$ alkylene units, more preferably include mono-, di- or triethylene glycol, dipropylene glycol and dimethylsulfoxide. Further preferably used are N-methylpyrrolidin-2-one, diethylene glycol, and dimethylsulfoxide.

The ink regulators, which are used to provide the aqueous solution containing the compound of the present invention (a dyestuff component) with a desired ink properties, include a preservative, a pH adjusting agent, a chelating agent, a rust preventive, a water-soluble ultraviolet absorbing agent, a water-soluble polymeric compound, a dye-dissolving agent and a surfactant. The preservative includes sodium dehydroacetate, sodium sorbate, sodium 2-pyridinethiol-1-oxide, sodium benzoate and sodium pentachlorophenol. The pH adjusting agent includes any substance that can control the ink pH preferably within a range of 6 to 11 with no adverse effect on the ink preparation. The examples are alkanolamines such as diethanolamine and triethanolamine; alkali metal hydroxides such as lithium hydroxide, sodium hydroxide, and potassium hydroxide; ammonium hydroxide; or alkali metal carbonates such as lithium carbonate, sodium carbonate and potassium carbonate. The chelating reagent includes sodium ethylenediaminetetraacetate, sodium nitrilotriacetate, sodium hydroxylethylenediaminetriacetate, sodium diethylenetriaminepentaacetate, and sodium uramil diacetate. The rust preventive includes acidic hyposulfite salts, sodium thiosulfate, ammonium thioglycolate, diisopropylammonium nitrite, tetranitrate pentaerythritol, and dicyclohexylammonium nitrite. The examples of a dye-dissolving agent include such as ε-caprolactam, urea and ethylene carbonate. The examples of a surfactant include the conventional anionic, cationic and nonionic surfactants.

A recording material used in ink-jet recording of the present invention includes an information transmission sheet such as paper and film, fiber and leather. It is preferable that the information transmission sheet is surface-treated and, practically, is coated with an ink-receiving layer on the basement material. The ink-receiving layer can be prepared, for example, by impregnating or coating a cationic polymer on the above basement material; or by coating an inorganic fine-particles capable of absorbing the dyestuff from an ink such as porous silica, alumina sol and special ceramic together with a hydrophilic polymer such as polyvinyl alcohol and polyvinyl pyrrolidone on the surface of the above basement material. The sheet having the ink-receiving layer is generally called an ink-jet special paper (film) or a glossy paper (film), and is available on the market, for example, as Pictorico (by Asahi Glass KK), Color BJ Paper, Color BJ Photofilm sheet (by Canon KK), Color Image Jet special paper (by Sharp KK), Superfine special glossy film (by Seiko Epson KK) and Pictafine (by Hitachi Maxell KK). A plain paper having no ink-receiving layer can of course be used also.

The preferable fiber is a cellulose fiber or polyamide fiber such as nylon, silk and wool in non-woven fabric or cloth. The ink composition of the present invention is applied, preferably by ink-jet, to the fiber followed by fixing by wet heat (for example, about 80–120° C.) or dry heat (for example, about 150–180° C.), so that the dyestuff can be set inside the fiber to give a colored article having excellent grade in vividness, light fastness and wash fastness.

The container of the present invention holds the above water-based magenta ink composition of the present invention in the container. The ink-jet printer of the present invention is equipped with the container of the present invention holding the water-based magenta ink composition on the ink-tank holder. The colored article of the present invention is dyed by the new anthrapyridone compound represented by the formula (1) or (2) or the salt thereof, preferably by the above water-based magenta ink composition.

The water-based ink composition of the present invention can give a vivid and nearly ideal magenta color, and therefore, if used together with a yellow or cyan ink, can give a wide visible range of color tone. Further, the composition, if used together with an existing yellow, cyan or black ink which is excellent in light fastness and water fastness, can provide a recorded product with excellent grade in light fastness, water fastness and gas fastness.

EXAMPLES

The present invention will be described below in more details with reference to Examples. "Part" and "%" in the description are shown by mass unless otherwise specified.

Example 1

(1) To 360 parts of xylene were added 94.8 parts of the compound represented by the formula (11) (R=CH$_3$), 3.0 parts of sodium carbonate and 144.0 parts of ethyl benzoylacetate successively under stirring, followed by raising the temperature. The solution was reacted at 140–150° C. for 8 hours, the formed ethanol and water during the reaction were removed by azeotropic distillation with xylene to complete the reaction. Successively, the residue was cooled, 240 parts of methanol were added, stirred at 30° C. for 30 min., filtered, washed with 360 parts of methanol, and dried to obtain 124.8 parts of the compound of the formula (12) (R=CH$_3$) as pale yellow needle crystals.

(2) To 300.0 parts of N,N-dimethylformamide were added 88.8 parts of the compound of the formula (12) (R=CH$_3$), 75.0 parts of methaminoacetanilide, 24.0 parts of cupper acetate monohydrate and 12.8 parts of sodium carbonate successively under stirring, followed by raising the temperature. The solution was reacted at 120–130° C. for 3 hours. Successively cooled to about 50° C., 120 parts of methanol were added, stirred for 30 minutes, filtered, washed with 500 parts of methanol, successively washed with hot water of 80° C. and dried to obtain 79.2 parts of the compound of the formula (13) (R=CH$_3$) as a bluish red crystal.

(3) To 178.5 parts of 96.6% sulfuric acid were added 271.5 parts of 26.5% fuming sulfuric acid under stirring and water cooling to prepare 450 parts of 10% fuming sulfuric acid. 77.0 parts of the compound of the formula (13) (R=CH$_3$) was added in 30 minutes under water cooling, followed by raising the temperature. The solution was reacted at 90–100° C. for 2 hours. Consequently, into 1000 parts of ice water was added the above obtained sulfonated solution keeping the reaction temperature at 40° C. or below by adding ice. Water was added to make the solution of 1500 parts, followed by filtered to remove insoluble matter. To the filtrate was added hot water to make the solution of 2250 parts, successively were added 450 parts of Sodium chloride under stirring for 2 hours at 50–60° C., followed by filtered the precipitated crystal. The obtained wet cake with 1500 parts of methanol was heated and stirred, and refluxed for 1 hour. After cooling to 40° C., the solution was filtered, followed by washed with 300 parts of methanol, dried to obtain 93.0 parts of the compound of the formula (6)(R=CH$_3$) as a red crystal. (purity 78.4% by diazo analysis)

(4) To 100 parts of ice water was added 0.3 parts of Lipal OH (trade name, a anionic surfactant, by Lion KK) to dissolve. 2.7 parts of cyanuric chloride was added to the solution, followed by stirring for 30 min. To the solution was added 11.9 parts of the compound of the formula (6) obtained in the above (3) (purity 78.4%) at 8–10° C., followed by dropping 10% aqueous sodium hydroxide to maintain the pH at 3–4 for 4 hours for the first condensation reaction at the temperature of 25–30° C., then filtered to remove insoluble matter to obtain the reaction solution containing the compound of the formula (7) (R=CH$_3$).

(5) To the reaction solution of the above (4) containing the compound of the formula (7) (R=CH$_3$) was added 0.4 parts of ethylenediamine, further was added water to make the solution of 200 parts, followed by raising the temperature and dropping 10% aqueous sodium hydroxide at 60–77° C. to maintain the pH at 5.0–5.5 for 1 hour for the second condensation reaction to obtain the solution containing the compound of the formula (9) (R=CH$_3$, A=ethylene group).

(6) To the reaction solution obtained in the above (5) containing the compound of the formula (9) (R=CH$_3$, A=ethylene group) was added 20 parts of 28% aqueous ammonia, followed by raising the temperature. The solution was reacted at 90–95° C. for 2 hours. After the reaction, water was added to adjust the reaction solution to 300 parts, into which Conc.HCl was added keeping the temperatutre at 50–55° C. to adjust the pH to 2, followed by adddded 70 parts of Sodium chloride and stirred at the same temperature. After 1 hour, crystal was filtered to separate to obtain the compound of the formula (10) (R=CH$_3$, A=ethylene group, Y=NH$_2$) as a red wet cake.

(7) The wet cake obtained in the above (6) was added in 250 parts of methanol, followed by heating at 60–65° C. and stirring for 1 hour, filtered, washed with methanol and dried to obtain 6.5 parts of the compound of the formula (10) (R=CH$_3$, A=ethylene group, Y=NH$_2$) (Compound No.3) as a red crystal.

λ max: 528.6 nm (in water).

Example 2

(1) To the reaction solution containing the compound of the formula (7) (R=CH$_3$) obtained as in (1)–(4) of Example 1 was added 0.9 parts of methaxylylenediamine, further was added water to make the solution of 200 parts, followed by increasing the temperature and dropping 10% aqueous sodium hydroxide at 50–60° C. to maintain the pH at 5.7 to 6.3 for 1 hour for the second condensation reaction to obtain the solution containing the compound of the formula (9) (R=CH$_3$, A=methaxylylene group).

(2) To the reaction solution obtained in the above (1) was added 20 parts of 28% aqueous ammonia, followed by raising the temperature. The solution was reacted at 90–95° C. for 2 hours. After the reaction, water was added to adjust the reaction solution to 300 parts, into which Conc.HCl was added keeping the temperature at 50–55° C. to adjust the pH to 2, followed by added 35 parts of Sodium chloride and stirred at the same temperature. After 1 hour, crystal was filtered to separate to obtain the compound of the formula (10) (R=CH$_3$, A=methaxylylene group, Y=NH$_2$) as a red wet cake.

(3) The wet cake obtained in the above (2) was added in 250 parts of methanol, followed by heating at 60–65° C. and stirring for 1 hour, filtered, washed with methanol and dried to obtain 9.2 parts of the compound of the formula (10) (R=CH$_3$, A=methaxylylene group, Y=NH$_2$) (Compound No.7) as a red crystal.

λ max: 537.8 nm (in water).

Example 3

(1) To 50 parts of ice water was added 0.3 parts of Lipal OH to dissolve. 2.7 parts of cyanuric chloride was added to the solution, followed by stirring for 30 min. To the solution was added 11.9 parts of the compound of the formula (6) (purity 78.4%) obtained in the above Example 1 (3) at 8–10° C., followed by dropping 10% aqueous sodium hydroxide at 25–30° C. to maintain the pH at 3–4 for 4 hours for the first condensation reaction and filtering to remove insoluble matter to obtain the reaction solution containing the compound of the formula (7) (R=CH$_3$).

(2) The reaction solution obtained in the above (1) containing the compound of the formula (7) (R=CH$_3$) was cooled to 10–15° C., into which was added 10% aqueous sodium hydroxide dropwise to adjust the pH to 10. To the reaction solution was added 1.8 parts of 28% aqueous ammonia. The solution was reacted at 10–15° C. for 2 hours and then at 25–30° C. for 1 hour to obtain the compound containing the products of the second condensation.

(3) The reaction solution obtained in the above (2) containing the products of the second condensation was heated to 90° C., into which was added 1.3 parts of 4,4'-diaminodicyclohexylmethane, followed by dropping 10% aqueous sodium hydroxide at 85–90° C. to maintain the pH at 9.0–9.3 for 1 hour for the reaction. Then, to the reaction solution was added water to adjust the solution to 200 parts, into which Conc.HCl was added keeping the temperature at 50–55° C. to adjust the pH to 0.1 or below. After 10 minutes, crystal was filtered to separate to obtain the compound of the formula (10) (R=CH$_3$, A=dicyclohexylmehtane-4,4'-diyl group, Y=NH$_2$) as a red wet cake.

(4) The wet cake obtained in the above (3) was added in 250 parts of methanol, followed by heating at 60–65° C. and stirring for 1 hour. The crystal was filtered, washed with methanol and dried to obtain 9.9 parts of the compound of the formula (10) (R=CH$_3$, A=dicyclohekylmehtane-4,4'-diyl group, Y=NH$_2$) (Compound No.20) as a red crystal.

λ max: 536.5 nm (in water).

Example 4

(1) To the reaction solution containing the compound of the formula (7) (R=CH$_3$) obtained as in (1)–(4) of Example 1 was added 1.4 parts of 4,4'-diamino-3,3'-dimethyldicyclohexylmehtane and further added water to make the solution of 200 parts, followed by increasing the temperature and dropping 10% aqueous sodium hydroxide at 50–60° C. to maintain the pH at 5.7 to 6.3 for 2 hours for the second condensation reaction to obtain the solution containing the compound of the formula (9) (R=CH$_3$, A=3,3'-dimethyldicyclohexylmehtane-4,4'-diyl group).

(2) To the reaction solution obtained in the above (1) was added 20 parts of 28% aqueous ammonia, followed by raising the temperature. The solution was reacted at 90–95° C. for 2 hours. After the reaction, water was added to adjust the reaction solution to 300 parts, into which Conc.HCl was added keeping the temperature at 50–55° C. to adjust the pH to 2, followed by adding 35 parts of Sodium chloride and stirred at the same temperature. After 1 hour, crystal was filtered to separate to obtain the compound of the formula (10) (R=CH$_3$, A=3,3'-dimethyldicyclohexylmehtane-4,4'-diyl group, Y=NH$_2$) as a red wet cake.

(3) The wet cake obtained in the above (2) was added in 250 parts of methanol, followed by heating at 60–65° C. and stirring for 1 hour. The crystal was filtered, washed with methanol and dried to obtain 8.1 parts of the compound of the formula (10) (R=CH$_3$, A=3,3'-dimethyldicyclohexylmehtane-4,4'-diyl group, Y=NH$_2$) (Compound No.19) as a red crystal.

λ max: 536.2 nm (in water).

Example 5

(A) Preparation of an Ink

Each water-based magenta ink composition for ink-jetting was produced by preparing the liquid containing the anthrapyridone compounds (dyestuff components) respectively obtained in Examples 1 and 2, which has a composition of Table 2 shown below, followed by filtering through 0.45 μm membrane filter. Ion exchanged water was used for the water. The water and ammonium hydroxide were added to adjust the ink composition to be 100 parts in total quantity and the pH at 8–10.

TABLE 2

| Dyestuff component (desalted) | 3.7 parts |
|---|---|
| Water + Ammonium hydroxide | 77.3 parts |
| Glycerin | 5.0 parts |
| Urea | 5.0 parts |
| N-methyl-2-pyrrolidone | 4.0 parts |
| IPA (isopropylalcohol) | 3.0 parts |
| Butylcarbitol | 2.0 parts |
| Total | 100.0 parts |

(B) Ink-jet Printing

By using an inkjet-printer (Tradename: BJ S-630, by Canon KK), ink-jet recordings were performed on two types of recording paper: Professional Photo Paper (PR-101, by Canon KK), and PM Photo Paper <Glossy> (by Seiko-Epson KK).

(hereinafter, PR refers to Professional Photo Paper; PM refers to PM Photo Paper)

(C) Evaluation of Recorded Image (1) Hue Evaluation

Hue and Vividness of Recorded Image: A recorded paper was subjected to color determination using the colorimeter (GRETAG SPM50, by GRETAG Co.) to calculate L*,a*,b* values. Hue was evaluated in comparison with a color sample of standard magenta in Japan Color by JNC (Japan Printing Machinery Manufacturers Association) and vividness was evaluated from a value calculated by the formula:

$$C^* = ((a^*)^2 + (b^*)^2)^{1/2}$$

The hue of the color sample of standard magenta in the JNC's Japan Color is shown in Table 3.

TABLE 3

|  | Hue | | | Vividness |
|---|---|---|---|---|
|  | L* | a* | b* | C* |
| JNC Standard Magenta | 46.3 | 74.4 | −4.8 | 74.6 |

Paper: the Japan Color Standard Paper (2) Light Fastness Test

Xenon Weather Meter (by Atlas Co. Ltd.) was used to irradiate on the recorded images at 24° C., 60% RH for 50 hrs. A color difference (ÄE) between before and after the test was measured by the above color determination system. The results are shown in Table 4.

(3) Ozone Gas Fastness Test

A piece of printed recording paper was placed in Ozone Weather Meter (by Suga Testing Machine Co.) for testing and kept in the condition at 40° C., 4 ppm for 10 hrs. A color difference (ÄE) between before and after the test was measured. The results are shown in Table 4.

(4) Moisture Fastness Test

A piece of a printed recording paper was placed in a constant temperature and humidity chamber at 50° C., 90% RH for 72 hours.

Breeding between before and after the test was judged by visual evaluation according to the following three standards:

○: no visible breeding

Δ: a little visible breeding

X: a large visible breeding

The results are shown in Table 4.

The results of tests in hue, vividness, light fastness, ozone gas fastness and moisture fastness of the recorded images are listed in Table 4, wherein Evaluation Example 1 shows the results of the evaluation of the ink composition produced from the compound obtained in Example 1 and so as Evaluation Example 2 shows the results of the evaluation of the ink composition produced from the compound obtained in Example 2. Further, Table 4 also includes Comparative Example 1 which shows the evaluation result by use of the anthrapyridone compound (Compound No.4) described in Example 2 of JP Laid-Open No.109464/2000 as well as Comparative Example 2 which shows the evaluation result by use of the anthrapyridone compound (Compound of the formula (1)) described in Synthesis Example 1 JP Laid-Open No.169776/2000.

TABLE 4

| No. | | Hue | | | Vividness | Light-fastness | Ozone-fastness | Moisture-fastness |
|---|---|---|---|---|---|---|---|---|
|  |  | L* | a* | b* | C* | ÄE | ÄE | fastness |
| Evaluation Example 1 | | | | | | | | |
| 1 | PR | 54.1 | 74.8 | −14.3 | 76.2 | 5.5 | 4.8 | ○ |
| 2 | PM | 54.8 | 74.5 | −16.5 | 76.3 | 5.2 | 5.4 | ○ |
| Evaluation Example 2 | | | | | | | | |
| 1 | PR | 51.6 | 76.6 | −27.2 | 81.3 | 8.6 | 3.2 | ○ |
| 2 | PM | 51.4 | 76.2 | −30.5 | 82.1 | 4.7 | 3.2 | ○-Δ |
| Comparative Example 1 | | | | | | | | |
| 1 | PR | 53.4 | 72.8 | −17.4 | 74.9 | 12.6 | 18.3 | ○ |
| 2 | PM | 57.2 | 70.9 | −9.3 | 71.5 | 7.5 | 21.1 | ○ |

TABLE 4-continued

| | | Hue | | Vivid-ness | Light-fastness | Ozone-fastness | Mois-ture- |
|---|---|---|---|---|---|---|---|
| No. | | L* | a* | b* | C* | ÄE | ÄE | fastness |

Comparative Example 2

| 1 | PR | 48.8 | 78.8 | −10.2 | 74.9 | 5.7 | 10.4 | Δ |
| 2 | PM | 48.6 | 80.3 | −16.1 | 71.5 | 4.9 | 6.9 | X |

Test Examples 3,4

Inkjet printing was performed by using the ink produced by the same methods as the above (A) and (B) using the anthrapyridone compounds respectively obtained in Examples 3 and 4. The recorded images were evaluated in the same manner as the above (C) other than the color determination was subjected to Gretag Macbeth SpectroEye. Evaluation Example 3 shows the result of the evaluation of the ink composition produced by using the compound obtained in Example 3 and Evaluation Example 4 shows the result of the evaluation of the ink composition produced by using the compound obtained in Example 4. The results of tests in hue, vividness, light fastness, ozone fastness and moisture fastness of the recorded images of the water-based magenta ink compositions of Evaluation Examples 3 and 4 are listed in Table 5 below.

TABLE 5

| | | Hue | | | Vivid-ness | Light-fastness | Ozone-fastness | Mois-ture- |
|---|---|---|---|---|---|---|---|---|
| No. | | L* | a* | b* | C* | ÄE | ÄE | fastness |

Evaluation Example 3

| 1 | PR | 52.1 | 82.5 | −25.6 | 86.4 | 7.7 | 3.8 | ○ |
| 2 | PM | 52.0 | 82.8 | −29.5 | 87.9 | 8.8 | 2.8 | ○ |

Evaluation Example 4

| 1 | PR | 55.8 | 79.4 | −26.1 | 83.6 | 9.2 | 4.9 | ○ |
| 2 | PM | 55.7 | 78.9 | −29.3 | 84.2 | 8.4 | 3.7 | ○ |

Comparative Example 1

| 1 | PR | 55.0 | 76.7 | −14.8 | 78.1 | 11.6 | 17.4 | ○ |
| 2 | PM | 55.6 | 75.8 | −15.2 | 77.3 | 8.1 | 12.9 | ○ (color change observed) |

Comparative Example 2

| 1 | PR | 55.7 | 76.1 | −19.7 | 78.6 | 7.5 | 10.3 | ○-Δ |
| 2 | PM | 56.1 | 75.4 | −23.0 | 78.2 | 5.0 | 5.5 | Δ-X |

The anthrapyridone compound of the present invention is suitable for an ink-jet magenta dystuff as the values in hue and vividness are close to those of JNC standard magenta's. Moreover, it is higher in C* value than JNC standard magenta and so is higher in vividness. The article of the present invention, having smaller ÄE values than those of Comparison Examples, can be evaluated as Magenta of high light fastness. The value of ozone fastness in the article of the present invention, having smaller ÄE values than those of Comparison Examples, shows a magnificent improvement in the ability at resistance to ozone gas. Being better in moisture fastness than Magenta of Comparison Example 2, the anthrapyridone compound of the present invention is consequently admitted to be extremely useful for magenta ink for ink jet recording improved in moisture fastness and maintaining high water fastness at the same time.

The anthrapyridone compound of the present invention is generally superior to the compound of Comparative Examples 1 or 2 and exhibits stable and high quality in each medium (recording material). Further, the dyestuffs for ink-jetting obtained in Example 1 to 4, having water-solubility of 100 g/l or more under an alkaline condition (pH 8–9), may be used easily as they have wide rage of application such that an ink of stable and of high concentration can be prepared by using them.

Industrial Applicability

The novel anthrapyridone compound of the present invention is excellent in water-solubility, stable in storing the solution and characterized by having a good ability to filter through a membrane filter in the production process of an ink composition. The compound is highly safe for a living body. Furthermore, the ink composition of the present invention using the novel anthrapyridone compound does not show a crystal deposition after a long storage, a change in property and a color change, so that it has good storage stability. The ink composition of the present invention, when used as a magenta ink for ink-jet recording, can provide a printed matter with excellent grade in light fastness, ozone fastness and moisture fastness. The composition also can provide a vivid printed surface as well as an ideal magenta color. The composition, when used together with a yellow or cyan ink, can provide a wide visible ray range of color tone. Therefore, the ink composition of the present invention is extremely useful as a magenta ink for ink-jet recording.

What is claimed is:

1. A new anthrapyridone compound represented by the following formula (14):

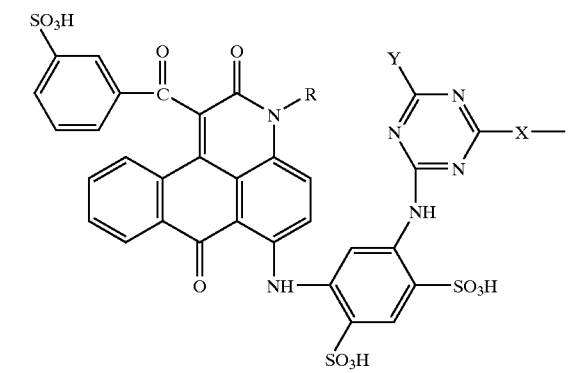

(14)

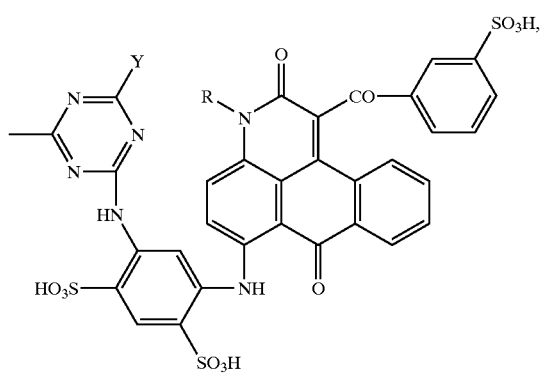

wherein R represents a hydrogen atom, an alkyl group, a hydroxy lower alkyl group, a cyclohexyl group, mono- or dialkylaminoalkyl group or a cyano lower alkyl group;

Y represents a chlorine, a hydroxyl group, an amino group, mono- or dialkylamino group (optionally substituted with a substituent selected from the group consisting of a sulfonic acid group, a carboxy group and a hydroxyl group on an alkyl group), an aralkylamino group, a cycloalkylamino group, an alkoxy group, a phenoxy group (optionally substituted with the substituent selected from the group consisting of a sulfonic acid group, a carboxy group, an acetylamino group, an amino group and a hydroxyl group), an anilino group (optionally substituted with one or two substituents selected from the group consisting of a sulfonic acid group and a carboxy group on a benzene ring), a naphthylamino group (wherein a naphthyl group is optionally substituted with a sulfonic acid group), or mono- or dialkylaminoalkylamino group;

X represents a connecting group;
or the salt thereof.

2. The new anthrapyridone compound according to claim 1, wherein the compound is represented by the following formula (1):

wherein Y represents a chlorine, a hydroxyl group, an amino group, mono- or dialkylamino group (optionally substituted with the substituent selected from the group consisting of a sulfonic acid group, a carboxy group and a hydroxyl group), an aralkylamino group, a cycloalkylamino group, an alkoxy group, a phenoxy group (optionally substituted with the substituent selected from the group consisting of a sulfonic acid group, a carboxy group, an acetylamino group, an amino group and a hydroxyl group), an anilino group (optionally substituted with one or two substituents selected from the group consisting of a sulfonic acid group and a carboxy group), a naphthylamino group (wherein a naphthyl group is optionally substituted with a sulfonic acid group), or mono- or dialkylaminoalkylamino group;

X represents a connecting group;
or the salt thereof.

4. The new anthrapyridone compound according to claim 3, wherein the compound is represented by the following formula (2):

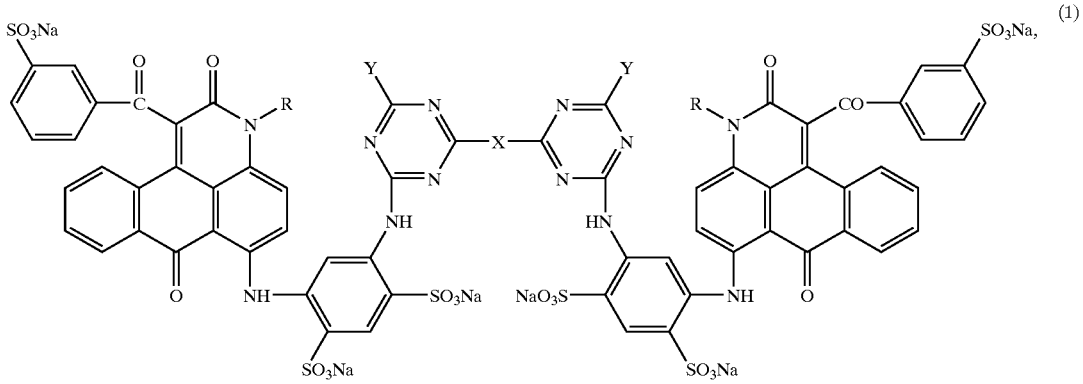

wherein R and Y represent the same as mentioned for the above formula (14), or the salt thereof.

3. A The new anthrapyridone compound according to claim 1, wherein the compound is represented by the following formula (15):

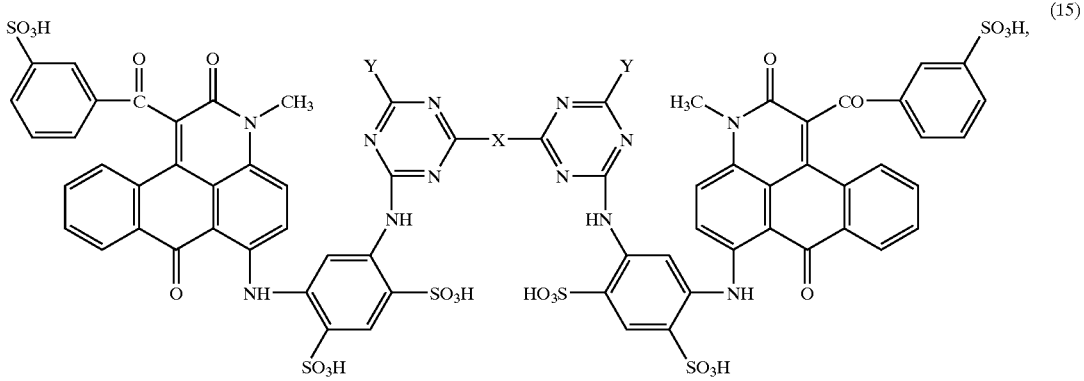

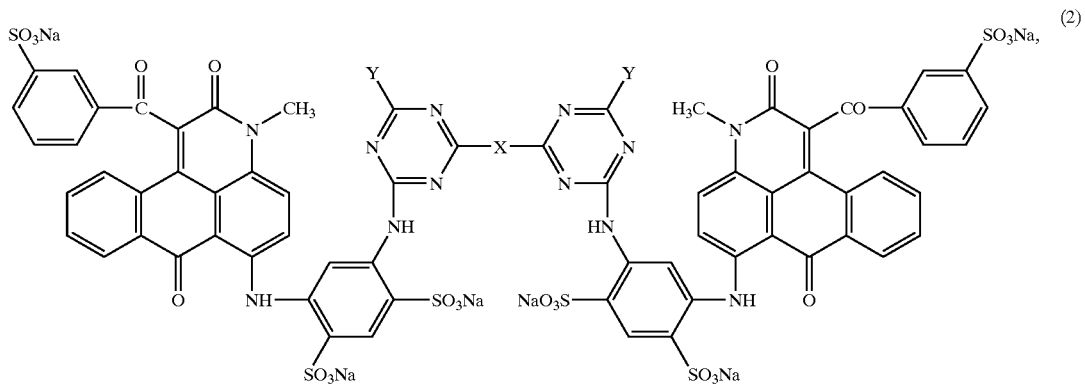

wherein Y represents the same as mentioned for the above formula (15), or the salt thereof.

5. The new anthrapyridone compound or the salt thereof according to claim 1, wherein Y is a hydroxyl group or an amino group.

6. The new anthrapyridone compound or the salt thereof according to claim 1, wherein Y is an amino group.

7. The new anthrapyridone compound or the salt thereof according to claim 1, wherein Y is an amino group and a connecting group X is a diaminoalkylene group.

8. The new anthrapyridone compound or the salt thereof according to claim 1, wherein Y is an amino group and a connecting group X is an optionally substituted diaminophenylene group.

9. The new anthrapyridone compound or the salt thereof according to claim 1, wherein Y is a chlorine atom or an amino group and a connecting group X is a diaminodicyclohexylmethane group optionally having a substituent on a cyclohexyl ring.

10. The new anthrapyridone compound according to claim 1, wherein the compound is represented by the following formula (3):

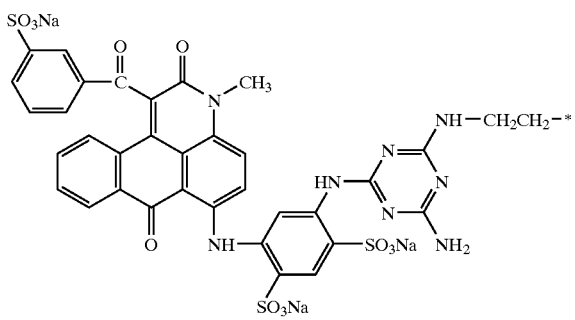

-continued or the salt thereof.

11. The new anthrapyridone compound according to claim 1, wherein the compound is represented by the following formula (4):

or the salt thereof.

12. The new anthrapyridone compound according to claim 1, wherein the compound is represented by the following formula (5):

(5)
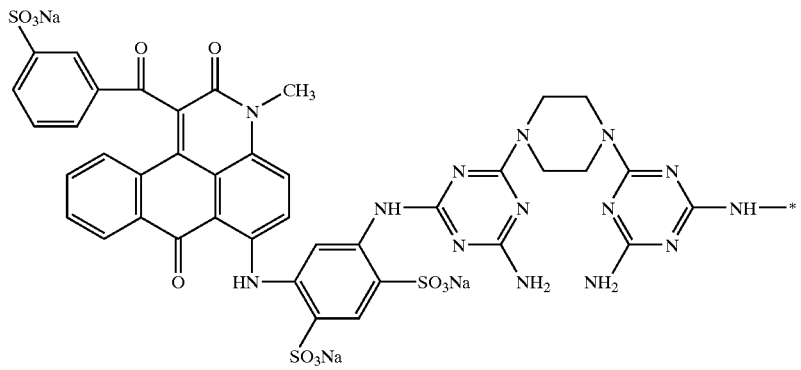
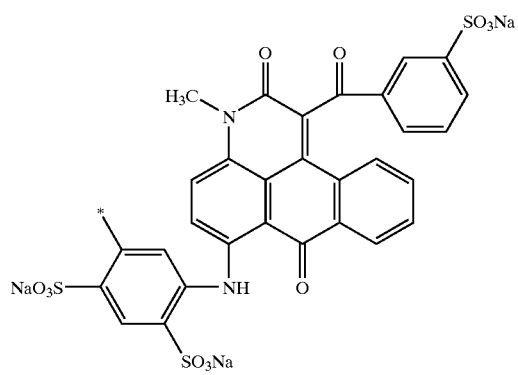
or the salt thereof.
13. The new anthrapyridone compound according to claim 1, wherein the compound is represented by the following formula (16):
(16)
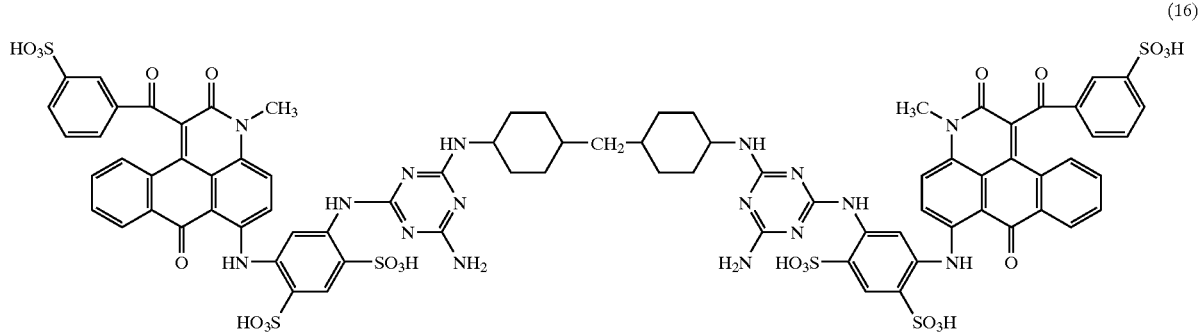
or the salt thereof.
14. The new anthrapyridone compound according to claim 1, wherein the compound is represented by the following formula (17):

(17)

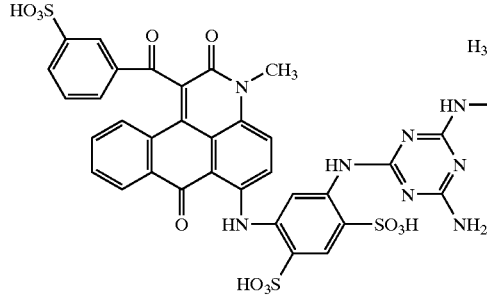 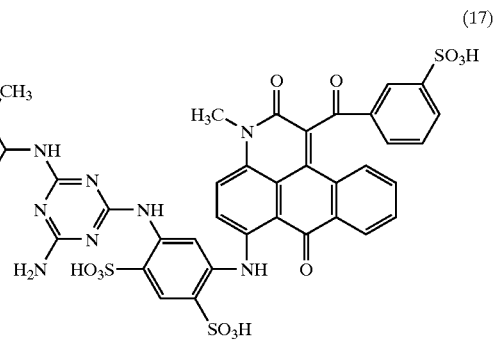

or the salt thereof.

15. A water-based magenta ink composition characterized by comprising a new anthrapyridone compound or the salt thereof according to claim 1 as a dyestuff.

16. The water-based magenta ink composition according to claim 15, wherein the composition is containing a water soluble organic solvent.

17. The water-based magenta ink composition according to claim 15, wherein the content of an inorganic salt in the dyestuff is 1% by mass or less.

18. The water-based magenta ink composition according to claim 15, which is prepared for ink-jet recording.

19. A method for ink-jet recording, wherein ink droplets are ejected responding to the record signals to record onto a recording material, characterized by using the water-based magenta ink composition according to claim 15 as an ink.

20. The method for ink-jet recording according to claim 19, wherein the recording material is an information transmission sheet.

21. A container comprising the water-based magenta ink composition according to claim 15.

22. An ink-jet printer comprising the container according to claim 21.

23. The water-based magenta ink composition according to claim 15 comprising the dyestuff containing an inorganic salt of 1% by mass or less and further comprising a water soluble organic solvent.

24. A colored article comprising the new anthrapyridone compound or the salt thereof according to claim 1.

25. The anthrapyridone compound or the salt thereof according to claim 1, wherein the bridging group X is represented by the formulae:

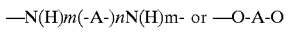

—N(H)$m$(-A-)$n$N(H)m- or —O-A-O wherein A is a divalent hydrocarbon residue having 1 to 20 carbon atoms, optionally comprising a nitrogen atom, an oxygen atom or a sulfur atom;

n indicates an integer of 1 or 2;

m indicates an integer of 1 or 0, when n is 1, m indicates 1; when n is 2, m indicates 0.

* * * * *